April 12, 1966 E. M. LANGSTON ETAL 3,246,232
GENERATOR EXCITER
Filed May 18, 1962
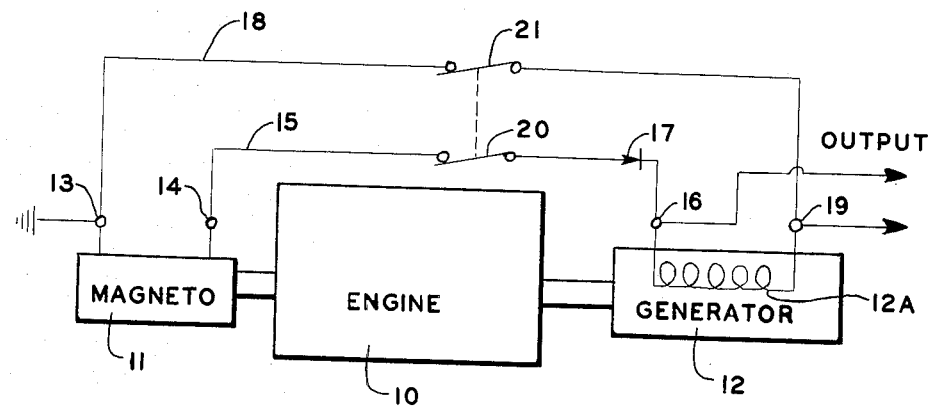
INVENTORS
EARL M. LANGSTON &
BY ALOIS L. JOKL
ATTORNEYS

United States Patent Office 3,246,232
Patented Apr. 12, 1966

3,246,232
GENERATOR EXCITER
Earl M. Langston and Alois L. Jokl, Dearborn, Mich., assignors to Continental Motors Corporation, Muskegon, Mich., a corporation of Virginia
Filed May 18, 1962, Ser. No. 195,860
5 Claims. (Cl. 322—60)

This invention relates to engine generator sets and more particularly to an improved means for providing the generator with an initial electrical charge in those situations in which there is insufficient residual magnetism to initiate the operation of the generator.

When a new generator or one which has been idle for a long period of time is put into operation, it is necessary to provide an external voltage source to excite the field coil before voltage will be produced. Generally, a battery or some other source separate from the engine is used for this purpose.

It is an object of the present invention to simplify construction and operation of engine generator sets in small magneto using engines by providing means utilizing the engine's magneto as a source of electrical energy for providing an initial charge to the generator.

Another object is to reduce the cost and weight of engine generator sets by providing means which eliminates the need for a separate unit such as a battery for exciting the generator.

Still another object of the present invention is to increase the reliability of generator exciting means for engine generator sets by providing a circuit which uses the engine ignition magneto to provide an initial electrical charge to the generator.

Still other objects and advantages will be readily apparent to one skilled in the art to which the invention pertains upon reference to the following drawing which illustrates diagrammatically a preferred embodiment of the present invention.

Now referring to the drawing for a more detailed description of the present invention, an engine 10 is shown as being provided with a magneto 11 for providing ignition spark to the engine 10 and a generator 12 being drivenly connected to a generator 12.

The magneto 11 is provided with a pair of terminals 13–14. The contact 14 is connected by a lead 15 to a terminal 16 provided on the generator 12 and connected with the field coil 12A. A rectifier 17 is provided in the lead 15 between the terminals 14 and 16.

The terminal 13 is preferably grounded as shown and is connected by lead 18 to a terminal 19 provided on the generator 12. The contact 19 is connected to the end of the field coil 12A opposite the terminal 16. Switches 20–21 are provided in the leads 15 and 18 respectively and are connected as shown to provide for simultaneous operation.

As the engine 10 starts, the magneto 11 will begin to produce the electrical energy necessary to provide the spark discharge necessary for engine operation. If the generator 12 is new or if it has been idle for such a period that insufficient residual magnetism is present in the stator to initiate voltage production, the switches 21–22 will be closed. A portion of the energy generated by the magneto 11 will then be diverted to the generator 12 to energize the field and thus to provide the required magnetism for the generator 12. After sufficient voltage has been provided for this purpose, the switches 21–22 are opened and normal operation of the generator 12 commences.

It is apparent that excitation for the generator is obtained from an already available ignition magneto on the engine generator set and that this magneto acts as a source of electrical energy for the excitation with the use of a simple circuit and rectifier. Since some separate unit would be necessary to provide the initial electrical charge the use of the magneto for this purpose results in a reduction in cost and weight. Further, good reliability is achieved because magnetos are ordinarily built for long endurance.

It is also apparent that although we have described but a single embodiment of the present invention, changes and modifications can be made without departing from the spirit of the invention or the scope of the appended claims.

We claim:
1. In combination with an engine having a magneto for providing ignition spark to the engine and a generator driven by said engine,
   (a) means electrically connecting said magneto to opposite ends of the field coil of said generator, and
   (b) switch means disposed in said electrical means whereby an initial electrical charge can be selectively supplied from said magneto to the field coil of said generator to create the magnetism necessary to initiate the production of voltage by said generator.
2. The device as defined in claim 1 and including a rectifier disposed in said electrical means intermediate said switch means and the input side of the field coil of said generator.
3. A system for providing an initial electrical charge to the generator member of an engine-generator set, said system comprising,
   (a) a magneto adapted for supplying spark discharge to the engine member of said set, and
   (b) electrical means selectively connecting said magneto to said generator to divert a portion of the electrical energy produced by said magneto to said generator.
4. The system as defined in claim 3 and in which said electrical means includes,
   (a) a rectifier disposed on the input side of said generator, and
   (b) switching means operable to open an electrical path between said magneto and said generator.
5. In an engine-generator set having means for supplying a spark discharge for the operation of said engine, means selectively electrically connecting said spark supplying means to the field coil of the generator member of said set.

References Cited by the Examiner

UNITED STATES PATENTS

| | | | |
|---|---|---|---|
| Re. 22,154 | 8/1942 | Mandl | 322—60 |
| 2,238,611 | 4/1941 | Tittle | 322—60 |
| 2,400,216 | 5/1946 | Smith | 290—37 |

LLOYD McCOLLUM, *Primary Examiner.*